United States Patent [19]
Parrino

[11] Patent Number: 5,491,901
[45] Date of Patent: Feb. 20, 1996

[54] MECHANICAL DEPTHSETTING DEVICE

[76] Inventor: Peter A. Parrino, 1002 Robert Dr., Godfrey, Ill. 62035

[21] Appl. No.: 347,894

[22] Filed: Dec. 1, 1994

[51] Int. Cl.⁶ .................................................. B25B 11/00
[52] U.S. Cl. ......................................... 33/528; 33/DIG. 10
[58] Field of Search ...................... 33/613, 528, DIG. 10

[56] References Cited

U.S. PATENT DOCUMENTS

| | | | |
|---|---|---|---|
| 1,850,616 | 3/1932 | Barnett . | |
| 2,919,913 | 1/1960 | Phair | 269/115 |
| 2,956,798 | 10/1960 | Briggs | 269/190 |
| 2,990,172 | 6/1961 | Gianotta | 269/116 |
| 3,154,304 | 10/1964 | Crawford | 33/DIG. 10 |
| 3,436,070 | 4/1969 | Utley et al. | 33/528 |
| 3,601,386 | 8/1971 | Estep | 269/6 |
| 3,626,600 | 12/1971 | Gaither | 33/180 |
| 3,954,717 | 5/1976 | Tarr | 33/DIG. 10 |
| 4,479,639 | 10/1984 | Kane | 33/DIG. 10 |
| 4,635,372 | 1/1987 | Tande | 33/180 |
| 4,750,271 | 6/1988 | Ericksen | 33/613 |
| 4,888,879 | 12/1989 | Dixon | 33/DIG. 10 |
| 4,890,391 | 1/1990 | Warren | 33/613 |
| 4,901,447 | 2/1990 | Gottschalk | 33/613 |
| 5,067,247 | 11/1991 | Milichichi et al. | 33/613 |
| 5,111,593 | 5/1992 | Gehen | 33/613 |
| 5,172,483 | 12/1992 | Yocono et al. | 33/528 |

Primary Examiner—William A. Cuchlinski, Jr.
Assistant Examiner—G. Bradley Bennett
Attorney, Agent, or Firm—Rogers, Howell & Haferkamp

[57] ABSTRACT

An apparatus is disclosed for use in positioning outlet, switching and like electrical boxes about either side of a standard construction support such as a stud or joist. The device enables a worker to position such a box at a predetermined distance outwardly from the support to correspond with the thickness of covering materials intended for attachment thereto. It also provides for the positioning of such boxes at an established distance from fixed structures such as walls or floors. The device comprises two essential components. Namely, a substantially rectangular first block-shaped component and a thinner, substantially square second wafer component which mounts in sliding, adjacent relation to the block component. In operation, a longitudinal slot measuring approximately 1/16" is formed between the first and second components of the device. This slot, which corresponds with the standard width of an electrical box sidewall, is designed to receive and firmly hold the sidewall of such boxes.

14 Claims, 1 Drawing Sheet

U.S. Patent      Feb. 20, 1996      5,491,901
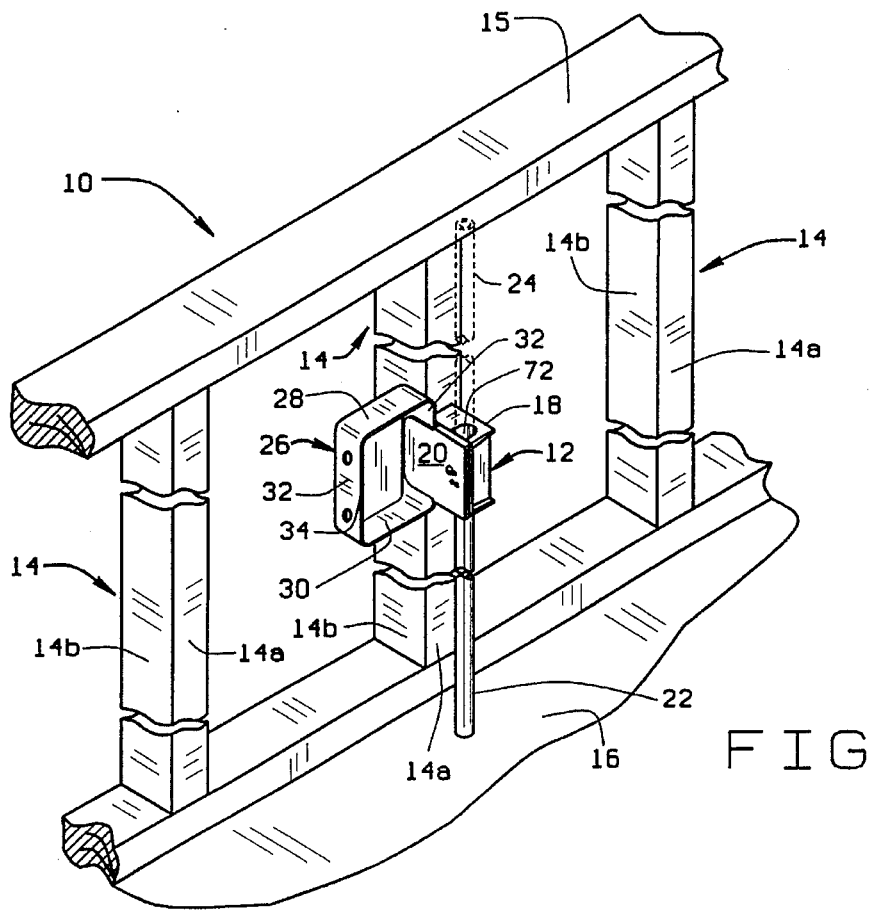

MECHANICAL DEPTHSETTING DEVICE

BACKGROUND OF THE INVENTION

1. Field of the Invention

The invention herein disclosed relates to an apparatus for use in positioning and in facilitating the uniform mounting of electrical outlet and switching boxes to standard construction supports such as studs or joists in a manner such that, when mounted, the outer periphery of each such box is displaced from the outward side of a support at a prescribed distance.

2. Description of the Related Art

Prior art inventions for positioning electrical boxes, generally as described, are disclosed in the following U.S. patents: Barnett U.S. Pat. No. 1,850,616, issued Mar. 22, 1932; Phair U.S. Pat. No. 2,919,913, issued Jan. 5, 1960; Briggs U.S. Pat. No. 2,956,798, issued Oct. 18, 1960; Gianotta U.S. Pat. No. 2,990,172, issued Jun. 27, 1961; Estep U.S. Pat. No. 3,601,386, issued Aug. 24, 1971; Tande U.S. Pat. No. 4,635,372, issued Jan. 13, 1987; Ericksen U.S. Pat. No. 4,750,271, issued Jun. 14, 1988; Warren U.S. Pat. No. 4,890,391, issued Jan. 2, 1990; Milichichi, et. al. U.S. Pat. No. 5,067,247, issued Nov. 26, 1991; and Gehen U.S. Pat. No. 5,111,593, issued May 2, 1992.

Generally, the prior art includes devices which suffer from a variety of practical and cost-based disadvantages when compared to the compact, relatively inexpensive and easy to use device of the present invention.

When using many of the prior art devices, the worker is required to individually calibrate a plurality of set screws and clamping means to set the amount the box to be mounted outwardly from the face of a stud to a desired distance and to adjust the height of a box to a desired elevation. These prior art devices involve many moving parts, most of which require adjustment during normal use. Invariably, these factors render the devices comparatively expensive to manufacture and cumbersome to use (i.e. numerous set screws must be adjusted and readjusted when changed height and depth requirements arise). Furthermore, the size of the devices, particularly when a height adjusting means of beyond a couple of feet is required, renders some of the devices bulky and inconvenient to transport and store.

Although some other devices in the prior art are more compact, these devices suffer from many of the same disadvantages that characterize the majority of the prior art devices. For example, the cost of manufacture, due to the number of its moving parts and use of springs will be comparatively high. Further, some of these prior art devices are also deficient in that its design allows for only one depth setting.

The aforementioned devices illustrate that the art has lacked an uncomplicated, durable and relatively inexpensive device for use in enabling a worker to efficiently position electrical boxes at uniform but readily variable heights and depths about a structure.

The invention disclosed herein provides a device which achieves these advantages in a manner not revealed by the prior art.

SUMMARY OF THE INVENTION

In the business of constructing and improving upon commercial, residential and other buildings, it is frequently necessary to install electrical service. Such service is provided by way of electrical wiring which is connected to other wiring as, for example, in a junction box or which terminates in an outlet or switching box where a switch, outlet or other hardware may be connected. Following proper positioning, as described, utility boxes are mounted to either side of a stud or joist as by conventional fasteners such as screws or nails.

During installation, it is desirable to uniformly position the electrical utility boxes about the walls, ceilings and/or floors of a structure. Due to various code requirements, specific placement is also frequently necessary.

Accomplishing the uniform positioning of boxes such as these typically entails taking measurements in two discrete dimensions. First, as for example with the placement of outlets about a room, it is necessary that each outlet box so placed is equally distanced above the floor. The second required measurement relates to the desirability of having the outer periphery of each outlet box be flush with the external surface of whatever covering material (i.e. flooring, ceiling or wall coverings) will be applied to the outward face of the support or stud to which the box is mounted.

The present invention provides a device which is compact, durable, uncomplicated and relatively inexpensive to manufacture which enables a worker to readily and uniformly position electrical boxes about a structure in a very efficient manner. Desirably, the device is relatively small, stowing easily in a worker's tool box, and it is lightweight, being not much larger or heavier than a standard pack of cigarettes. Furthermore, the design of the device is simple and principally comprises only two interrelating parts.

The first part is a wafer component which slides and lockingly engages about a second block component. The wafer is designed to receive the sidewall of an electrical box and is specially configured so as to firmly hold the box in order that the-box may be positioned and mounted about the side of a construction support. The wafer includes a stop means and is slidable about the block component to allow for the positioning of the periphery of the box, relative to the face of the construction support, at variable distances.

The block component is configured to lockingly engage the wafer, variably, and to receive tubing of established length. Standard tubing which is pre-cut to a desired length is used to position the device at a desired height, for example from a floor, or other relative distance from a fixed support such as a wall. The tubing readily connects to the device by insertion into voids pre-formed within the block component. Thus, by inserting tubing of an established length into the block component of the device and by adjusting the wafer component to a desired extension, a worker is able to use the device to uniformly position and mount utility boxes about a structure.

BRIEF DESCRIPTION OF THE DRAWINGS

Further objects and features of the present invention are revealed in the following Detailed Description of the Preferred Embodiment of the invention and in the drawing figures wherein:

FIG. 1 is an orthographic projection showing one operative environment of the invention;

FIG. 2 is a top, plan view of the apparatus of the invention in a retracted position;

FIG. 3 is an additional top, plan view of the apparatus of the invention in an extended position;

FIG. 4 is a side, elevation view of the apparatus; and

FIG. 5 is a cross-sectional view taken in the plane of line 5—5 of FIG. 4.

DETAILED DESCRIPTION OF THE PREFERRED EMBODIMENT

Referring now by reference numerals to the drawings, attention is initially directed to FIG. 1. It will be understood that shown therein is an operative environment 10 of the positioning device 12 of the present invention. Included within the environment are a plurality of vertical supports 14 each having a front 14a and a side 14b aspect as well as upper 15 and lower 15a horizontal supports which, for purposes of explaining the use of the device 12 in this environment, respectively represent the upper and lower structural members of an unfinished wall generally comprising upper 15 and lower 15a horizontal supports and vertical supports 14.

Also shown in FIG. 1 is a cut-away section of a floor 16 as well as lower tube 22 and upper tube 24 (shown in phantom), which respectively adapt for use with the device 12 as a means of positioning its desired height relative, for example, a floor 16 or a ceiling (not shown).

Further shown in FIG. 1 is a conventional electric utility box 26 having a top 28, a bottom 30 and opposing sides 32. The box 26 is further characterized by an outer periphery 34 which, as clearly shown in FIG. 1, is disposed relatively forward of the front 14a aspect of one of the supports 14.

The positioning device 12, as clearly shown in FIGS. 1–3, is preferably comprised of a block 18 component and a wafer 20 component each of which are preferably made of a thermoplastic composition such as high impact polyethylene.

As can be appreciated, particularly by reference to FIG. 1, one of the opposing sides 32 of a conventional utility box 26 is received by the wafer 20 component of the device 12 and held in engagement with the block 18 component of the device 12 during positioning.

Conventional electrical utility boxes, such as shown by 26, are made of a variety of materials including metals and plastics and are configured both as single boxes (shown) and as ganged boxes (not shown). Further, the dimensions of such boxes vary depending upon intended function. Nevertheless, two fairly consistent features characterize boxes of this nature. First, the opposing sidewalls of such boxes, as representatively shown in FIGS. 1–3, are usually not less than 4 inches in length. Second, the widths of the walls of such boxes are fairly standardized at about 1/16 of an inch. Thus, the present invention is adapted to take advantage of these common attributes.

For example, and referring now to FIGS. 2 and 3 which show the device 12 from the top in abutting relation with the front 14a aspect of a vertical support 14 (in phantom), it can be seen that the device 12 is specially configured such that a longitudinal slot 36 is formed between the wafer 20 and block components of the device 12. Slot 36 preferably measures about 1/16 of an ? inch in width and is designed to hold the comparably dimensioned sidewall 32 of a conventional utility box 26 in pressing engagement between the block 18 component of the device and the protruding tongue 38 of the wafer 20 component.

As shown in FIG. 1, the length of the sidewall 32 of a utility box 26 need not be the same as the top to bottom length of the tongue 38 of the device 12 in order that the box 26 be held firmly by the device 12 for positioning. This is due to the snug fit created when the sidewall 32 is inserted into the slot 36.

As can best be appreciated by referring to FIGS. 2, 3 and 5, the means by which the slot 36 is formed involves the incorporation of integral and opposing side flanges 40 into wafer 20 component, orthogonal to its outside surface 20, which are disposed for sliding engagement with correspondingly opposite recessed channels 42 within block 18 component. Alternatively, the flanges 40 may extend from the block 18 and slidingly engage the wafer 20. The dimension of the opposing side flanges 40, and thus the depth of the correspondingly opposite recessed channels 42 is such that the wafer component 20 is displaced from the block 18 component by a desirable distance of about 1/16 of an inch.

As explained, this distance corresponds with the standard width of the walls of a conventional utility box. Without departing from the spirit of the invention, those skilled in the art can readily appreciate that simple modifications to this aspect of the invention will allow the device 12 to also be used in conjunction with boxes having walls of non-standard widths.

As best shown by reference to FIGS. 2, 3 and 4, the device 12 employs a stop 44 which is formed at the intersection where the tongue 38 of the wafer 20 component meets both of its opposing flanges 40. The stop 44, which engages a portion of the periphery 34 of a utility box 26, ensures that sidewall 32 is received squarely by the device 12. Inserting the periphery 34 of sidewall 32 into abutting engagement with stop 44 ensures that, ultimately, periphery 34 will be planar with the front 14a aspect of vertical support 14 when the box is mounted to one of the side 14b aspects thereof.

The present invention, shown representatively as device 12 in each of the drawings, also includes a means for maintaining mated relation between the wafer 20 and block 18 components. The same means also functions to enable the wafer 20 to lockingly engage the block 18 component variably.

In particular, and in a preferred embodiment as shown clearly in FIG. 4, four indexing holes, horizontally arranged in two sets of two, are disposed within the wafer 20 component. When FIG. 5 is considered together with FIG. 4, it can be seen that the top two holes 46 (in phantom) and 48 are associated with a first tubular column 50 in the block 18 having a hex nut 52 secured in the block 18 at the bottom of the column. In a similar manner, the lower two holes 54 and 56 are associated with a second tubular column 58 in the block 18 also having a hex nut 60 secured therein at the bottom of the column.

The four indexing holes 46, 48 and 54, 56 correspond with the most common thicknesses of wall coverings such as plywood, paneling and sheetrock (gypsum). For example, hole 46 corresponds with 5/8 inch, hole 48 with 3/8 inch, hole 54 with 1/2 inch and hole 56 with 1/4 inch.

When a suitable fastener such as screw 61 (as best shown in FIGS. 2, 3, 4 and 5) is inserted within either of holes 46 or 48 and through first tubular column 50 into locking engagement with nut 52, the device 12 is suitable for use in positioning a utility box 26 such that its periphery 34 is flush with covering materials, such as sheetrock, of 5/8 or 3/8 thicknesses.

In like fashion, using holes 54 or 56 and the second tubular column, the device 12 readily adapts for use in positioning a utility box 26 about which covering materials having a thickness of 1/2 or 1/4 inch will be applied.

By referring to FIGS. 4 and 2, in that order, it can readily be appreciated that when the device 12 is locked in the 5/8 inch position (i.e. screw 61 is secured within index hole 46), the wafer 20 is in its fully retracted position. In this position, the butt side 62 of the wafer 20 is flush with the back side 64 of block 18 and distance x, shown in FIG. 2, equals 5/8 of an inch.

FIG. 3 shows the wafer 20 in its fully extended position meaning that screw 61 is secured within index hole 56. Thus, distance y, shown therein, equals 1/4 of an inch. As shown in FIG. 5, upper 66 and lower 68 protrusions extend from wafer 20 to within block 18. These protrusions engage inner walls (not shown) of block 18 and serve as stop means between the fully retracted and extended positions of the wafer 20 as described.

In operation, as clearly shown in FIGS. 1, 2 and 3, the device 12 is first adjusted to the desired depth setting according to the thickness of the covering that is intended for application. Next, a sidewall 32 of a utility box 26 is inserted into slot 36 of the device 12. The sidewall 32 is then brought flush with the side 14b aspect of a support 14 and the face side 66 of the block 18 is brought flush with its front 14a aspect. The box 26 is then positioned for mounting to the support 14 as by conventional means.

Positioning the box 26 about the support 14 at a relative height is accomplished simply by inserting a desired length of tubing such as PVC, which is commonly used in and about a construction site, into pre-formed recesses 72 which are molded into the block 18 component. When installing different types of utility boxes, such as a plurality of outlets which are desired to be at a first uniform height and also switching boxes which are desired to be mounted at a second uniform height, differing lengths of tubing may be readily interchanged for use with the device 12.

Other embodiments of the present invention are also contemplated. For example, with respect to providing a means for having wafer 20 lockingly engage block 18 component variably, other designs of the invention are possible. In particular, additional index holes can be added to the device 12 to adapt it for use with covering materials of a broader range of thicknesses.

Further, the device 12 could be easily modified such that a single tubular column is disposed within the block 18 component and such that, associated therewith is an indexed slot disposed within the wafer 20. A fastener assembly such as a screw and a wing nut could thus be provided and would enable the device 12 to more readily adjust for use in installing coverings of varying thickness.

Other embodiments notwithstanding, the embodiment of the present invention as thus described and shown in the accompanying FIGS. 1–5 is considered preferred. Several advantages inhere in the preferred embodiment. First, the device is configured to positively lock at each of the four most common depth settings. This feature of the invention ensures that, despite repeated usage of the device, the depth setting will remain constant thereby assuring that each box thus installed will project outwardly from a support at a uniform distance.

Still further, the preferred embodiment provides a highly compact device 12 in which the block 18 component measures about 3.5×2.5×1.5 inches and the wafer 20 component measures about 3.5×3.5×⅜ inches. thus, the device 12 can readily be stored in a worker's toolbox.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated.

Thus, while the present invention has been described by reference to specific embodiments, it should be understood that modifications and variations of the invention may be constructed without departing from the scope of the invention as defined by the appended claims.

What is claimed is:

1. An apparatus for use by a worker in positioning a utility box having opposing sidewalls of a predetermined thickness along one side of a construction support comprising:

a block first component having a plurality of generally planar sides, one of the plurality of block first component sides being adapted to engage the one side of the construction support;

a wafer second component which attaches in sliding relation to said first component in such a manner as to define a longitudinal slot having a varying depth therebetween configured to accept one of the opposing sidewalls of said utility box and having a fixed width adapted to accept the one sidewall with an interference fit; wherein one of said components further includes a flange which projects outwardly and away from said one component toward the other of said components, wherein said other component further comprises a recess disposed thereon, said recess being adapted to receive said flange, and wherein said flange is received for slidable movement by the recess; and means for selectively varying said depth of said longitudinal slot.

2. The apparatus of claim 1, wherein said means for selectively varying said depth of said longitudinal slot comprises in associated combination:

a plurality of indexing holes disposed within said wafer component and bored therethrough;

a suitable fastener for insertion through any one of said indexing holes; and means disposed within said block first component for securing said fastener such that the one indexing hole in which said fastener is secured corresponds with a desired depth of said longitudinal slot.

3. The apparatus of claim 1 further comprising means for positioning said apparatus at a desired distance relative an existing structure.

4. The apparatus of claim 3 further including a recess formed in said block first component and wherein said means for positioning said apparatus relative a fixed structure comprises a member having a length equal to the distance from said structure, said member being received in said recess.

5. The apparatus of claim 1, wherein the means for selectively varying the depth of the longitudinal slot comprises:

a plurality of indexing holes having diameters positioned in one of the first and second components, at least one of the plurality of indexing holes being longitudinally offset from another of the plurality of indexing holes to permit adjustment of the slot depth in an increment less than the diameters of the indexing holes.

6. The apparatus of claim 5, further comprising:

a fastener configured to extend into one of the plurality of indexing holes to secure the first and second components and fix the depth of the slot.

7. An apparatus for use by a worker in positioning a utility box having opposing sidewalls of a predetermined thickness along one side of a construction support comprising:

a block first component having a plurality of sides, one of the plurality of block first component sides being adapted to engage the one side of the construction support;

a wafer second component which attaches in sliding relation to said first component about one of the sides of the block component in such a manner as to define a longitudinal slot having a varying depth therebetween configured to accept one of the opposing sidewalls of said utility box and having a fixed width adapted to accept the one sidewall with an interference fit; wherein one of said components further includes a flange which projects outwardly and away from said one component toward the other of said components, wherein said other component further comprises a channel disposed thereon, said channel being adapted to receive said flange, and wherein said flange is received for slidable movement by the channel;

means for selectively varying said depth of said longitudinal slot; and means for positioning said apparatus at a desired distance from an existing structure.

8. The apparatus of claim 7, wherein said means for selectively varying said depth of said longitudinal slot comprises in associated combination:

an indexing hole disposed within the wafer component and bored therethrough;

a suitable fastener for insertion through said indexing hole; and means disposed within said block first component for securing said fastener such that the indexing hole in which said fastener is secured corresponds with a desired depth of said longitudinal slot.

9. The apparatus of claim 7 further including a recess formed in said block first component and wherein said means for positioning said apparatus relative an existing structure comprises a member having a length equal to the distance from said structure, said member being received in said recess.

10. The apparatus of claim 7, wherein the means for selectively varying the depth of the longitudinal slot comprises:

a plurality of indexing holes having diameter positioned in one of the first and second components, at least one of the plurality of indexing holes being longitudinally offset from another of the plurality of indexing holes to permit adjustment of the slot depth in an increment less than the diameter of the indexing holes.

11. A method for positioning a utility box having opposing sidewalls and a peripheral edge common to said sidewalls along one side of a construction support, the method comprising the steps of:

providing a block first component having a top, a bottom and first and second pairs of opposing sides, said second pair of opposing sides being normal to said first pair of opposing sides;

providing a wafer second component in attached, sliding relation to said first component such as to define a longitudinal slot having a varying depth therebetween; wherein one of said components further includes a flange which projects outwardly and away from said one component toward the other of said components, wherein said other component further comprises a recess disposed thereon, said recess being adapted to receive said flange, and wherein said flange is received for slidable movement by the recess;

providing means for selectively varying said depth of said slot;

inserting one of said sidewalls of said utility box into said slot such that said sidewall is interference fitted between said block first and said wafer second components;

positioning one of said second pair of opposing sides in abutting relation with a side of said construction support normal to that side of said support along which said utility box is intended to be mounted; and adjusting said depth of said slot to correspond with a distance said peripheral edge of said utility box is desired to be disposed from said normal side of said construction support.

12. The method of claim 11, wherein the step of providing means for selectively varying said depth of said longitudinal slot further comprises in associated combination:

an indexing hole disposed within said wafer second component and bored therethrough;

a suitable fastener for insertion through said indexing hole; and means disposed within said block first component for securing said fastener such that the indexing hole in which said fastener is secured corresponds with a desired depth of said longitudinal slot.

13. The method of claim 11 further comprising providing means for positioning said apparatus at a desired distance relative an existing structure.

14. The method of claim 13 further comprising the step of including a recess formed in said block first component and wherein said step of providing means for positioning said apparatus relative an existing structure further comprises a member having a length equal to the distance from said structure, said member being received in said recess.

* * * * *